US012443944B2

(12) United States Patent
Hawk et al.

(10) Patent No.: US 12,443,944 B2
(45) Date of Patent: Oct. 14, 2025

(54) AUTHORIZING PAYMENTS USING PRE-REGISTERED CUSTOMER TOKENS

(71) Applicant: TOSHIBA GLOBAL COMMERCE SOLUTIONS, INC., Durham, NC (US)

(72) Inventors: James I. Hawk, Morrisville, NC (US); Susan W. Brosnan, Raleigh, NC (US); Brad M. Johnson, Raleigh, NC (US); Stacy Arrington, Morrisville, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 168 days.

(21) Appl. No.: 18/353,190

(22) Filed: Jul. 17, 2023

(65) Prior Publication Data

US 2025/0029096 A1    Jan. 23, 2025

(51) Int. Cl.
*G06Q 20/38* (2012.01)
*G06Q 20/20* (2012.01)
*G06Q 20/40* (2012.01)

(52) U.S. Cl.
CPC ......... *G06Q 20/3821* (2013.01); *G06Q 20/20* (2013.01); *G06Q 20/409* (2013.01)

(58) Field of Classification Search
CPC .. G06Q 20/3821; G06Q 20/20; G06Q 20/409; G06Q 20/327; G06Q 20/385
See application file for complete search history.

(56) References Cited

U.S. PATENT DOCUMENTS

| | | | |
|---|---|---|---|
| 10,332,110 B2 | 6/2019 | Patel et al. | |
| 2011/0251892 A1* | 10/2011 | Laracey | G06Q 20/20 705/16 |
| 2014/0164237 A1* | 6/2014 | Blanco | G06Q 20/202 705/44 |
| 2014/0330721 A1* | 11/2014 | Wang | G06Q 20/40 705/44 |
| 2015/0186871 A1* | 7/2015 | Laracey | G06Q 20/322 705/41 |
| 2016/0321659 A1* | 11/2016 | Annesley-DeWinter | G06Q 10/103 |
| 2020/0320487 A1* | 10/2020 | Dutt | G06Q 20/047 |

* cited by examiner

*Primary Examiner* — A. Hunter Wilder
(74) *Attorney, Agent, or Firm* — Patterson + Sheridan, LLP; Gero G. McClellan

(57) ABSTRACT

A method, computer program product, and system are described. The method comprises receiving payment information, receiving a communication from an electronic device of a user, wherein the communication comprises a token that corresponds to the combination of the user and the electronic device. The method further comprises transmitting, to a payment processor of a payment network, the token and an identifier of the electronic device that is derived from the communication. The method further comprises receiving, from the payment network, a payment authorization that indicates that the token and the identifier of the electronic device were previously registered with an issuer corresponding to the payment information.

11 Claims, 6 Drawing Sheets

AUTHORIZING PAYMENTS USING PRE-REGISTERED CUSTOMER TOKENS

BACKGROUND

Within the service industry, merchants routinely use point of sale (POS) systems to provide a platform for customers to pay for goods or services. Modern POS systems may include personal identification number (PIN) pads to support a high volume of small-ticket customer transactions. Customers interact with a PIN pad by swiping, dipping, or a tapping a debit card, credit card, or smart card on electronic components of the PIN pad. The PIN pad reads the customer's PIN during the interaction, and encrypts the PIN for transmission as part of a payment authorization process.

DETAILED DESCRIPTION

Figure 1:
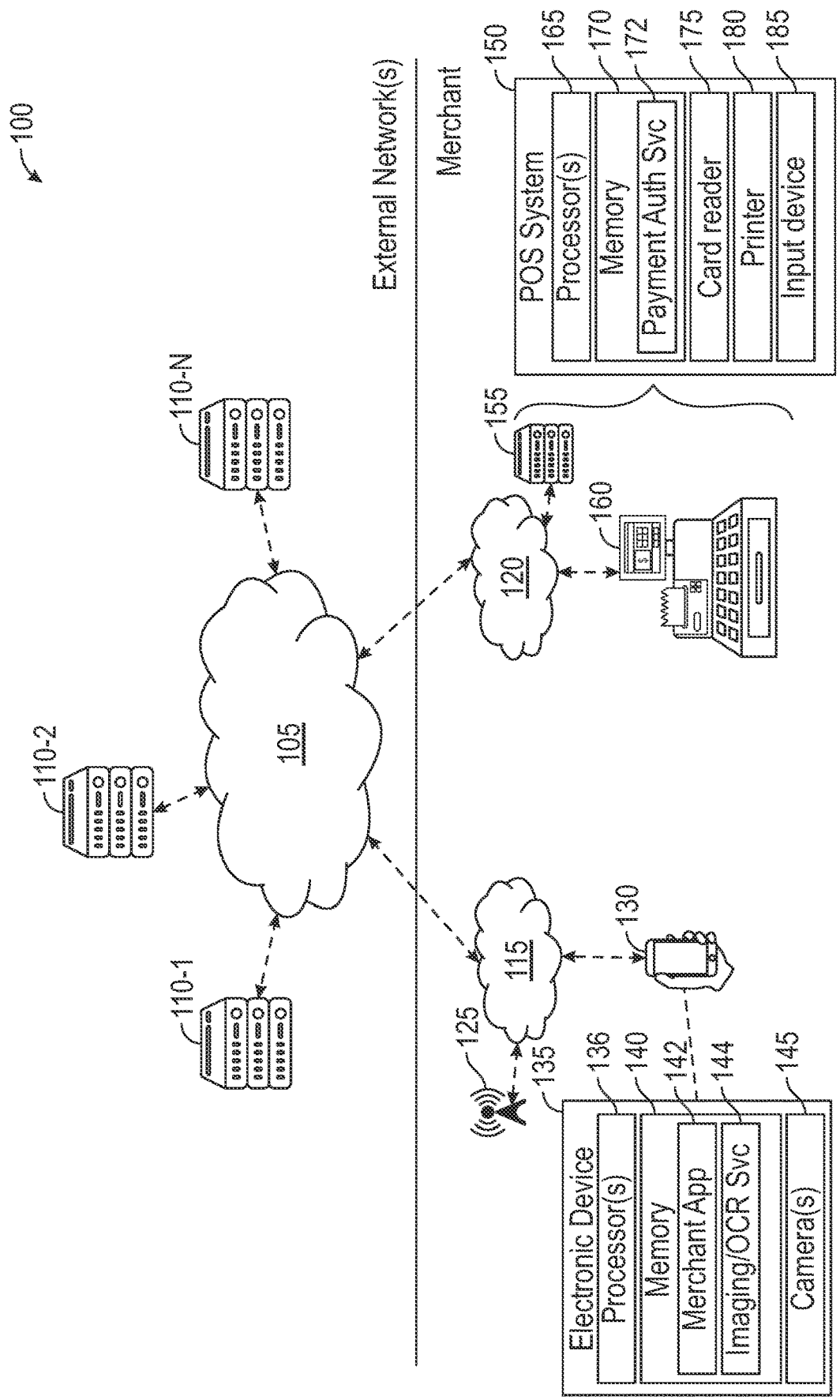
FIG. 1 illustrates an exemplary system for authorizing payments using an electronic device and a POS system, according to one or more embodiments.

Though the use of PIN pads has become widespread, operating and maintaining PIN pads can be expensive for a merchant. In some cases, PIN pads may also be inconvenient or even an impediment to accept certain types of transactions.

Further, in some types of transactions, an initial authorization is performed for the customer's payment method, and the customer is then prompted to add an amount to the total of the transaction (e.g., writing a gratuity on a receipt). Some PIN pads may not be able to accommodate such transactions. Additionally, customer-added amounts can be entered inaccurately into the POS system, whether intentional (e.g., another party fraudulently enters a larger gratuity) or unintentional (e.g., the amount is keyed in incorrectly).

Personal electronic devices of users, such as smartphones or wearables, may be used to provide multi-factor and multi-step authentication for transactions, removing any requirement for merchants to operate and maintain separate PIN pads. In this disclosure, an electronic device pre-registers with an issuer of a payment method (e.g., a credit card issuer), and the issuer provides a token corresponding to the combination of the user and the electronic device. The token may be based on a unique hardware identifier of the electronic device, such as a MAC address.

During a transaction, the electronic device transmits a communication (including the token) to a point of sale (POS) system, which then transmits the token and the identifier of the electronic device to a payment network. In some cases, the POS system may derive the identifier of the electronic device from the communication, e.g., by inspecting header information. When the POS system receives a payment authorization for the transaction, this indicates that the token and the identifier of the electronic device have been pre-registered with the issuer of the payment method. Using this token-based validation, the transaction can be authorized without using the PAN (primary account number) of the customer. In this way, the transaction authorization process can be completed without requiring the entire POS system to comply with security standards having stricter requirements.

Further, the personal electronic device can be used in a closed-loop authentication process that authenticates customer-added amounts. For example, a customer receives a receipt from a merchant that includes a field for a gratuity. After writing in the amount of the gratuity, the customer captures an image of the receipt using the electronic device. The customer uses an app or a website to transmit the image (or text derived from the image) to the issuer of the payment method. The issuer of the payment method determines whether the amount of the receipt corresponds to the amount entered at the POS system when determining whether to authorize the payment. In this way, the responsibility for authorizing gratuity amounts (and any associated risk) may be transferred away from the merchant to the issuer of the payment method.

Turn now to FIG. 1, which illustrates an exemplary system 100 for authorizing payments using an electronic device 135 of a customer 130 and a POS system 150 of a merchant. The system 100 includes a public network 115 and a private network 120 of the merchant, each encompassing a respective one or more electronic devices that operate to provide control and/or data to one or more client electronic devices when the one or more client electronic devices are connected to the respective one of the public network 115 and the private network 120. As used herein, "electronic device" generally refers to any device having electronic circuitry that provides a processing or computing capability, which implements logic and/or executes program code to perform various operations that collectively define the functionality of the electronic device. The functionality of the electronic device includes a communicative capability with one or more other electronic devices, e.g., when connected to a same network. An electronic device may be implemented with any suitable form factor, whether relatively static in nature (e.g., mainframe, computer terminal, server, kiosk, workstation) or mobile (e.g., laptop computer, tablet, handheld, smart phone, wearable device). The communicative capability between electronic devices may be achieved using any suitable techniques, such as conductive cabling, wireless transmission, optical transmission, and so forth.

One or more electronic devices of the merchant that are included in the public network 115 and the private network 120 are "on-site", that is, disposed on the physical premises of the merchant (e.g., within the store, restaurant, building). In some embodiments, one or more other electronic devices of the merchant are "off-site", that is, disposed apart from the physical premises of the merchant and communicatively coupled with the on-site electronic device(s). In some embodiments, the off-site electronic device(s) are not owned by the merchant but are allocated, assigned, leased, etc. in whole or in part to the merchant.

As shown, the POS system 150 comprises one or more servers 155 that are communicatively coupled with a POS terminal 160 through the private network 120. The POS system 150 comprises one or more processors 165, a memory 170, and a number of input/output devices that are communicatively coupled with the one or more processors 165.

The one or more processors 165 are any electronic circuitry, including, but not limited to one or a combination of microprocessors, microcontrollers, application-specific integrated circuits (ASIC), application-specific instruction set processors (ASIP), and/or state machines, that is communicatively couples to the memory 170 and controls the operation of the POS system 150. The one or more processors 165 is not limited to a single processing device and may encompass multiple processing devices.

The one or more processors 165 may include other hardware that operates software to control and process information. The one or more processors 165 executes software stored in the memory 170 to perform any of the functions described herein. The one or more processors 165 control the operation and administration of the POS system 150 by processing information (e.g., information received from input devices and/or communicatively coupled electronic devices).

The memory 170 may store, either permanently or temporarily, data, operational software, or other information for the one or more processors 165. The memory 170 may include any one or a combination of volatile or non-volatile local or remote devices suitable for storing information. For example, the memory 170 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 170, a disk, a CD, or a flash drive. In particular embodiments, the software may include an application executable by the one or more processors 165 to perform one or more of the functions described herein.

In this example, the memory 170 stores a payment authorization service 172 that communicates with one or more electronic devices of an external payment network and/or the electronic device 135 for transactions performed using the POS system 150. The payment network is discussed in greater detail with respect to FIG. 2. The payment authorization service 172 may be implemented as a software application that is executed by the one or more processors 165.

The input/output devices of the POS system 150 comprise a card reader 175, a printer, and an input device 185. The card reader 175 reads an account number (or card number) and/or other information from a debit card, credit card, or smart card using any suitable technologies. For example, the card reader 175 may include a magnetic stripe reader, an EMV chip reader, and/or a NFC chip.

The printer 180 outputs a receipt or invoice for the transaction using any suitable printing technologies on paper or other suitable materials. The receipt is presented to the customer. In some cases, the printer 180 generates a first receipt with transaction information, prompting the customer to present a payment method for an initial authorization. Responsive to the initial authorization, the printer 180 generates a second receipt that includes a field for a customer-added amount, such as a gratuity. The customer-updated transaction information is entered into the POS system 150 for a subsequent authorization.

The input device 185 has any suitable implementation for receiving user inputs (e.g., an employee or other representative of the merchant). Some non-limiting examples of the input device 185 include a keyboard, a touchscreen, and a fingerprint sensor. In some embodiments, the input device 185 is used by an employee of the merchant to manually enter customer-added amounts to transactions.

The public network 115 of the merchant comprises one or more access points 125 providing wireless connections for customers, guests, employees, etc. on the physical premises of the merchant. In another example, the access points 125 provide connections to the external network 105, e.g., a public network such as the internet. The public network 115 is typically distinct from the private network 120 to accommodate customers or other guests, while avoiding unnecessarily exposing the various components of the POS system 150. However, alternate implementations may combine the functionality of the public network 115 and the private network 120 into a single network of the merchant.

A customer 130 operates an electronic device 135 to connect to the public network 115 through the access point 125. The electronic device 135 may have any suitable implementation, and in many cases is implemented as a mobile electronic device such as a laptop, smart phone, or wearable device. The electronic device 135 comprises one or more processors 136 and a memory 140. The description of the one or more processors 136 is similar to that of the one or more processors 165, and the description of the memory 140 is similar to that of the memory 170. In this example, the memory 140 stores a merchant app 142 and an imaging/OCR service 144. The merchant app 142 comprises program code executed by the one or more processors 136 to perform one or more of the following functions: to pre-register the electronic device 135 with the issuer of the payment method (e.g., via communication with the payment network), to receive token(s) (which in some cases includes single-use token(s)), and transmit image-based updated transaction information to the payment network. Some or all of the functionality of the merchant app 142 may be implemented separately. Further, the merchant app 142 may have alternate functionality that is not discussed here.

The imaging/OCR service 144 comprises program code executed by the one or more processors 136 to capture, using a camera 145 of the electronic device, an image of a physical receipt that includes customer-provided updated transaction information. In some embodiments, OCR processing is performed on the image and the customer-provided updated transaction information is transmitted to the payment network. In other embodiments, the image is transmitted to the payment network, and OCR processing occurs within the payment network. The imaging/OCR service 144 may be included in the merchant app 142 or separately therefrom (e.g., included in separate app(s) or within the operating system of the electronic device 135).

In some embodiments, the electronic device 135 operates the camera 145 or one or more other input devices (not shown) to authenticate the customer. The electronic device 135 may prompt the customer to authenticate responsive to one or more conditions: periodically (e.g., elapse of a period of time), on transitions out of sleep or low-power states, on loading the merchant app 142, and so forth. In one example, the camera 145 may capture an image of the customer, and facial recognition processing is performed on the image to authenticate the customer. In another example, a touchscreen of the electronic device 135 receives a password or passcode from the customer. In another example, a fingerprint sensor of the electronic device 135 receives a fingerprint from the customer. In some embodiments, the electronic device 135 transferring a token to the payment network indicates to the payment network that the customer has been authenticated, e.g., within a recent window of time. Stated another way, the electronic device 135 may decline to transmit the token when the customer has not (recently) been authenticated.

The public network 115 and the private network 120 of the merchant are communicatively coupled to one or more external networks 105. In some embodiments, the external network 105 is a public network, e.g., the internet. The external network 105 encompasses a large number of electronic devices, and may provide network connections over a large area, when compared with the relatively limited public network 115 and private network 120 of the merchant.

The payment network is implemented using a plurality of electronic devices communicatively coupled through the external network 105, such as the server computers 110-1, 110-2, . . . , 110-N. The various electronic devices of the payment network may be owned or operated by different entities, which in turn are distinct from the merchant.

Figure 2:
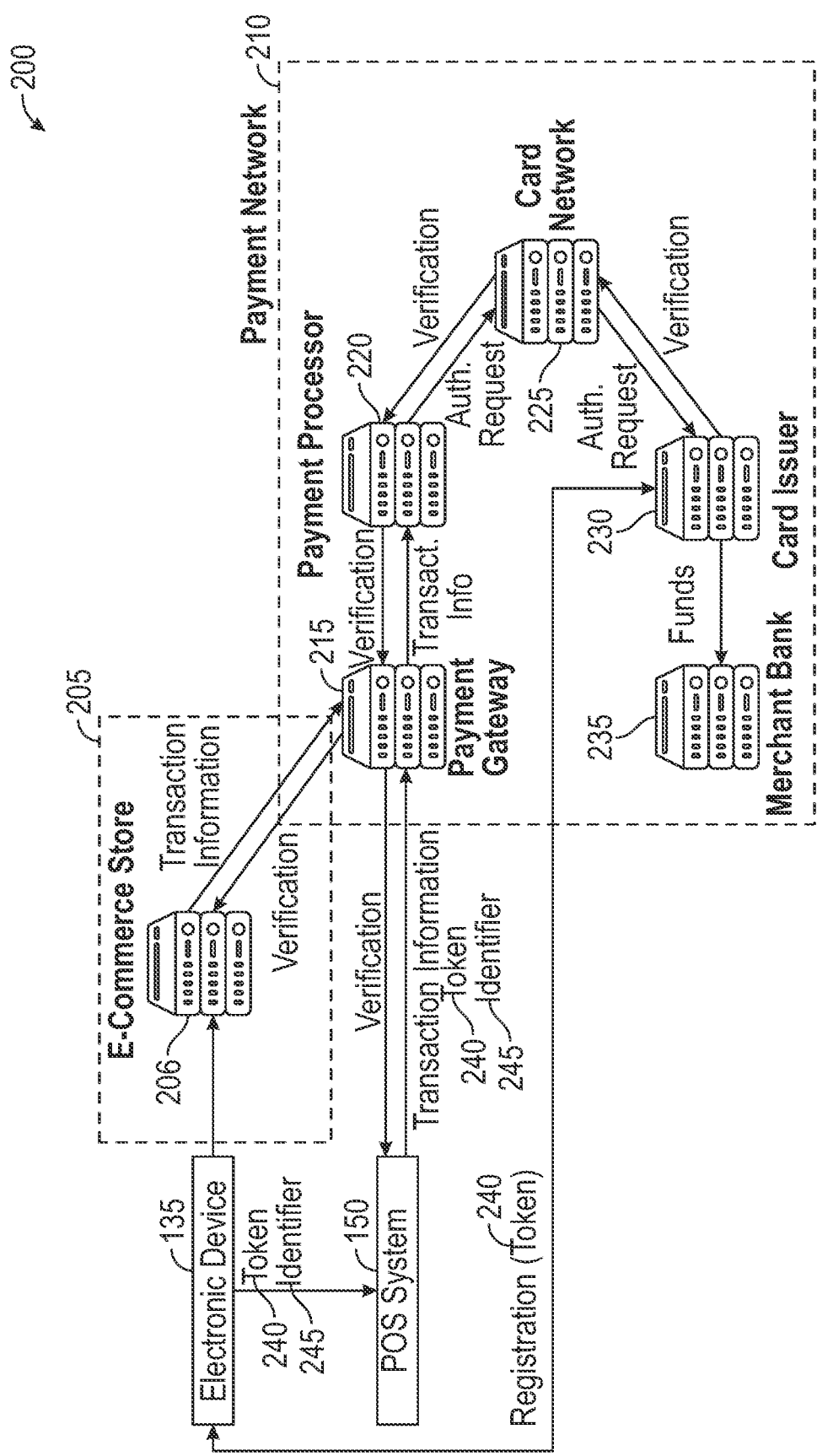
FIG. 2 is a diagram illustrating an exemplary payment network, according to one or more embodiments.

Turn now to FIG. 2, which is a diagram 200 illustrating an exemplary payment network 210. Diagram 200 illustrates an exemplary sequence of a payment authentication process for a transaction from the POS system 150. The features illustrated in the diagram 200 may be used in conjunction with other embodiments.

In some embodiments, the POS system 150 receives a payment method from a customer 130 (e.g., card account information) and performs a first (initial) authorization for the transaction. In some embodiments, the POS system 150 transmits transaction information (e.g., the card account information, the amount of the transaction) to a payment gateway 215 of the payment network 210. The payment gateway 215 facilitates the information transfer between a payment portal and the payment processor 220. The payment portal may be a "card-present" payment environment such as the POS system 150, or a "card-not-present" payment environment such as the e-commerce store 205. The payment gateway 215 encrypts the card information and other sensitive information to ensure security of the transaction.

In some embodiments, the customer 130 pre-registers the electronic device 135 with the card issuer 230, and receives a token 240 which corresponds to the combination of the customer 130 and the electronic device 135. The token 240 may have any suitable length and form. In some embodiments, a hash function may be applied to a unique (hardware) identifier 245 of the electronic device 135 (such as a MAC address) and an identifier of the customer 130 to generate a unique hash value for the combination. In other embodiments, the unique identifier 245 of the electronic device 135 and the identifier of the customer 130 may be combined using one or more arithmetic or logical functions. In one simplified example, the unique identifier 245 of the electronic device 135 and the identifier of the customer 130 may be concatenated within the token 240. In another simplified example, the identifier of the customer 130 and the unique identifier 245 of the electronic device 135 are multiplied and the result included in the token 240. The identifier of the customer 130 may be retrieved downstream by dividing the result within the token 240 by the unique identifier 245 of the electronic device 135. Other techniques of generating the token 240 are also contemplated.

During the payment authentication process, the electronic device 135 transmits a communication to the POS system 150 that includes the token 240. The POS system 150 transmits the token 240, as well as the identifier 245 of the electronic device 135, to the payment network 210. The identifier 245 of the electronic device 135 is derived from the communication. In some embodiments, the POS system 150 extracts the identifier 245 from header information of the communication (e.g., a MAC address of the electronic device 135). In other embodiments, the identifier 245 may be included in payload information of the communication.

In some embodiments, the POS system 150 transmits the token 240 and the identifier 245 of the electronic device 135 with the transaction information to the payment gateway 215. The transaction information (with the token 240 and the identifier 245) is sent from the payment gateway 215 to a payment processor 220, which transmits an authorization request (with the token 240 and the identifier 245) to the card network 225. In alternate embodiments, the payment gateway 215 may be omitted, such that the POS system 150 communicates directly with the payment processor 220.

The payment processor 220 maintains compliance with the Payment Card Industry Data Security Standards (PCI DSS). In some cases, the payment processor 220 provides its own payment gateway 215. In other cases, the payment processor 220 has a reseller agreement to provide the payment gateway 215.

The card network 225 sends an authorization request to the card issuer 230 (also referred to as the "cardholder's bank" or "consumer bank", which represents the issuer of the payment method presented by the customer for the transaction). In some embodiments, the authorization request to the card issuer 230 includes the token 240 and the identifier 245. The card network 225 is operated by the "brand" of the customer's card, such as American Express, Visa, MasterCard, or Discover. The card network 225 is typically responsible for setting interchange and assessment fees, as well as setting the standards for PCI DSS compliance.

The card issuer 230 makes the determination whether to authorize the payment. In some embodiments, the card issuer 230 determines whether the payment method (e.g., cardholder's account) has sufficient funds or credit for the amount of the transaction. In some embodiments, the card issuer 230 also determines whether the token 240 and the identifier 245, received with the authorization request, match the token and the identifier that were issued by the card issuer 230 during the registration of the electronic device 135. In some embodiments, the card issuer 230 also performs fraud analysis on the transaction. The card issuer 230 transmits a verification back through the payment network 210 to the POS system 150 (or to the e-commerce store 206).

In some embodiments, after the verification for the first (initial) authorization, the POS system 150 receives customer-updated transaction information and performs a second authorization therewith using the payment network 210. Assuming the second authorization is verified, the card issuer 230 also communicates with a merchant bank 235 (also referred to as an "acquiring bank") to release funds for settlement of the transaction.

Although the payment network 210 has been depicted as including the payment gateway 215, the payment processor 220, the card network 225, the card issuer 230, and the merchant bank 235, alternate implementations of the payment network 210 may have different numbers and/or configurations of elements. For example, an alternate implementation may have fewer intermediary elements before the authorization request reaches the issuer of the payment method (e.g., the card issuer 230) and the merchant bank 235.

Figure 3:
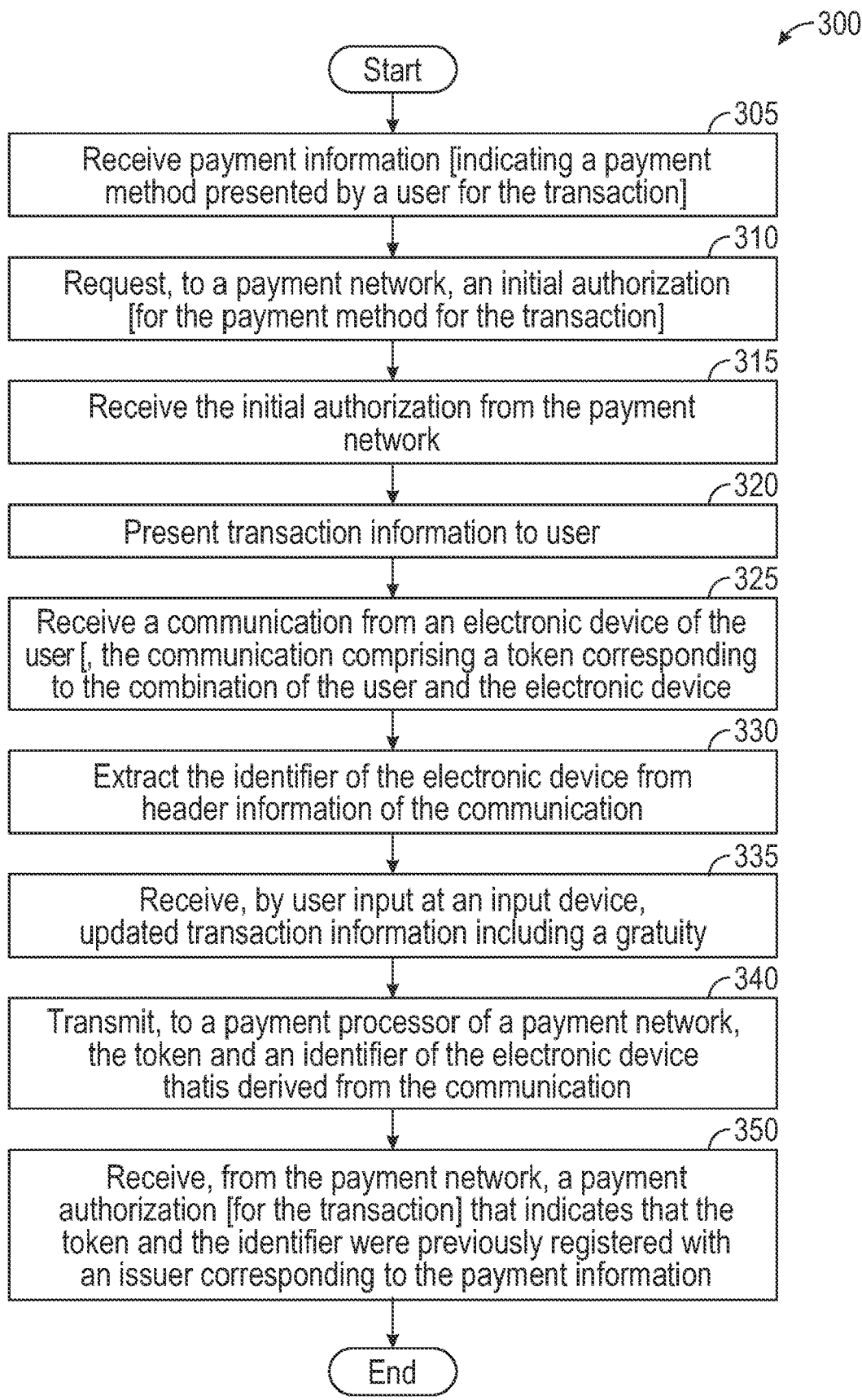
FIG. 3 is a method using a point of sale (POS) system to authorize payment for a transaction illustrating an exemplary payment network, according to one or more embodiments.

FIG. 3 is a method 300 using a point of sale (POS) system to authorize payment for a transaction illustrating an exemplary payment network, according to one or more embodiments. The method 300 may be used in conjunction with other embodiments, for example, using the POS system 150 and various elements of the payment network 210.

The method 300 begins at block 305, where the POS system 150 receives payment information, which in some cases indicates a payment method presented by a user (e.g., the customer 130) for the transaction. In some embodiments, the payment method comprises a credit card, debit card, or smart card of the user.

At block 310, the POS system 150 requests, to the payment network 210, an initial authorization, which in some cases is for the payment method for the transaction. In some embodiments, the initial authorization corresponds to an amount of the transaction not including a customer-added amount, such as a gratuity.

At block 315, the POS system 150 receives the initial authorization from the payment network 210. At block 320, the POS system 150 presents the transaction information to the user. In some embodiments, presenting the transaction information comprises printing a receipt that includes a field for a customer-added amount, such as a gratuity.

At block 325, the POS system 150 receives, from the electronic device 135 of the user, a communication comprising the token 240 which corresponds to the combination of the user and the electronic device 135. In some embodiments, at block 330, the POS system 150 extracts the identifier 245 of the electronic device 135 from header information of the communication. Stated another way, the electronic device 135 does not include the identifier 245 in payload information of the communication, allowing for a more secure authorization as well as a smaller and relatively faster communication. In other embodiments, the POS system 150 extracts the identifier 245 from the payload information of the communication.

At block 335, the POS system 150 receives, by user input at an input device 185 of the POS system 150, updated transaction information including a gratuity.

At block 340, the POS system 150 transmits, to a payment processor 220 of the payment network 210, the token 240 and the identifier 245 of the electronic device 135 that is derived from the communication. In some embodiments, the token 240 is a single-use token that is linked to the amount of the transaction, or alternately, to a maximum authorized amount for the transaction. In some embodiments, the token 240 and the identifier 245 are transmitted through one or more intermediate elements of the payment network 210 (e.g., the payment gateway 215) before reaching the payment processor 220. In some embodiments, the token 240 and the identifier 245 are further transmitted along one or more other elements of the payment network 210.

At block 350, the POS system 150 receives, from the payment network 210, a payment authorization, in some cases for the transaction, that indicates that the token 240 and the identifier 245 were previously registered with an issuer corresponding to the payment information (e.g., an issuer of the payment method). In some embodiments, receiving the payment authorization further indicates that the amount of the updated transaction information is less than or equal to an authorized amount for the transaction that is included in the single-use token. The method 300 ends following completion of block 350.

Figure 4:
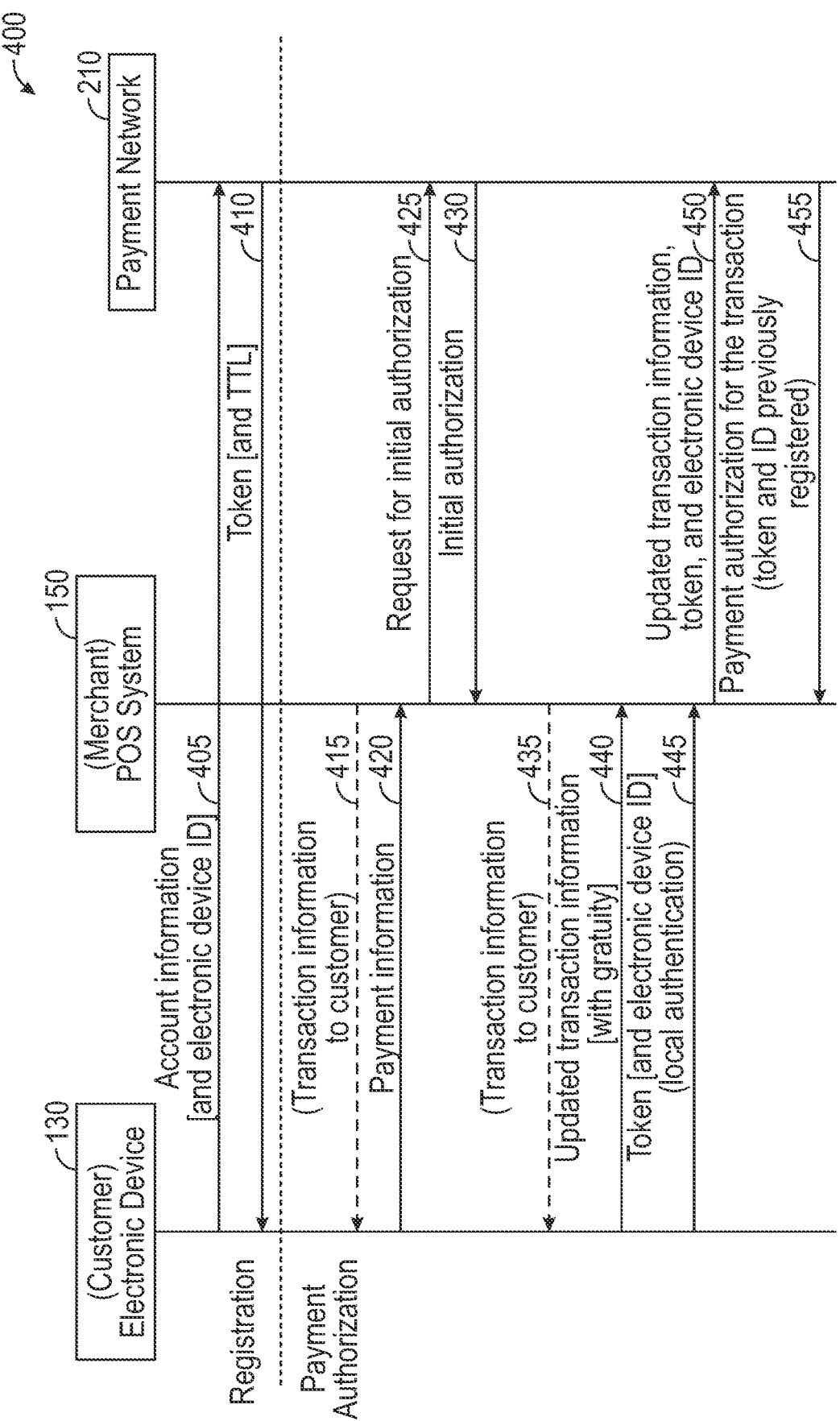
FIG. 4 is a communication diagram illustrating exemplary payment authorization using a pre-registered token, according to one or more embodiments.

FIG. 4 is an exemplary communication diagram 400 illustrating payment authorization using a pre-registered token, according to one or more embodiments. The features in the communication diagram 400 may be used in conjunction with other embodiments, for example, as part of performing the method 300 of FIG. 3.

During a registration phase the electronic device 135 transmits, in a first communication 405, account information of the customer 130 and an identifier 245 of the electronic device 135 to the payment network 210. In some embodiments, the identifier 245 comprises a MAC address of the Wi-Fi network interface card or of a NFC chip of the electronic device 135. In some embodiments, the first communication 405 is transmitted directly between the electronic device 135 and an issuer of the payment method (e.g., the card issuer 230 of the payment network 210). The payment network 210 returns to the electronic device 135, in a second communication 410, a token which corresponds to the combination of the customer and the electronic device 135. In some embodiments, the issuer of the payment method transmits the token to the electronic device 135 with a time-to-live (TTL) value, such that the token expires after a predetermined amount of time. The TTL value limits the possibility of fraudulent use by another who improperly obtains the token. In some embodiments, the information of the first communication 405 is transmitted between the card issuer 230 and one or more other elements of the payment network 210, such as the payment processor 220.

During a payment authorization phase, the POS system 150 provides transaction information to the customer in a third communication 415. In some embodiments, providing the transaction information comprises printing a first receipt with the transaction information, prompting the customer to present payment information to the POS system 150 in a fourth communication 420 (e.g., a payment method for an initial authorization).

The POS system 150 transmits, in a fifth communication 425, a request for an initial authorization to the payment network 210. The POS system 150 receives, in a sixth communication 430, the initial authorization from the payment network 210.

Responsive to the initial authorization, the POS system 150 provides the transaction information to the customer in a seventh communication 435. In some embodiments, providing the transaction information comprises printing a second receipt that includes a field for a customer-added amount, such as a gratuity.

The POS system 150 receives, in an eighth communication 440, updated transaction information, which in some cases includes a gratuity. The POS system 150 receives, in a ninth communication 445, the token and the identifier of the electronic device 135 from the electronic device 135. In some embodiments, receiving the ninth communication 445 indicates that the customer has been locally authenticated by the electronic device, using a password or biometrics. In some embodiments, the POS system 150 extracts the identifier of the electronic device 135 from the protocol used for the communication.

The POS system 150 transmits, in a tenth communication 450, the updated transaction information, token, and identifier of the electronic device to the payment network 210 for a subsequent authorization. The POS system 150 receives, in an eleventh communication 455, the payment authorization for the transaction from the payment network 210. In some embodiments, receiving the eleventh communication 455 indicates that the token and identifier of the electronic device were previously registered with the issuer of the payment method.

In some embodiments, the payment processor 220 of the payment network 210 validates the updated transaction information, token, and identifier using information included in the first communication 405 in the registration phase. Using the token-based validation, the transaction can be authorized without using the PAN (primary account number) of the customer. In this way, the transaction authorization can be completed without requiring the POS system 150 to be maintained within the scope of PCI DSS.

Figure 5:
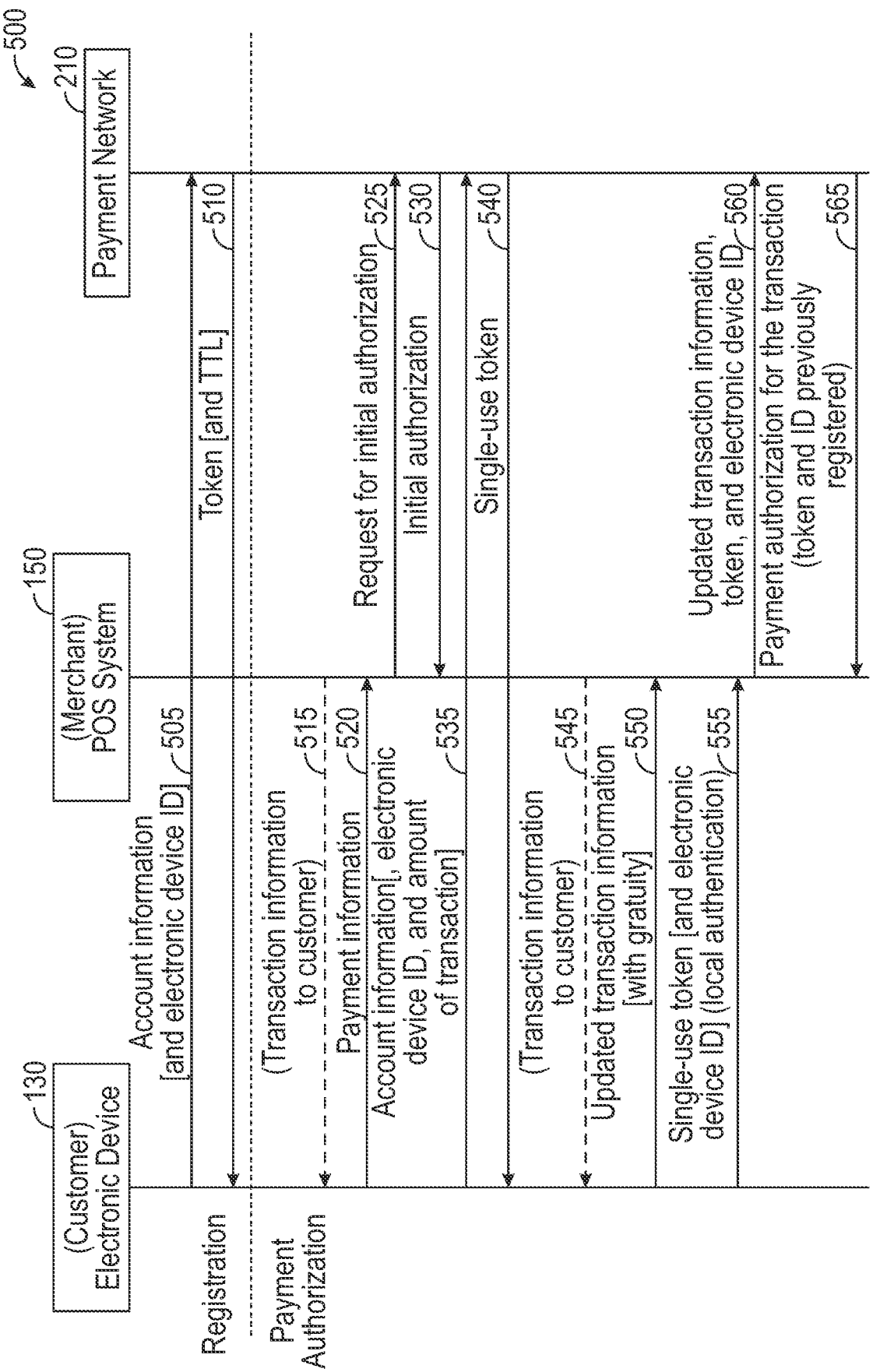
FIG. 5 is a communication diagram illustrating exemplary payment authorization using a single-use token, according to one or more embodiments.

FIG. 5 is an exemplary communication diagram 500 illustrating payment authorization using a single-use token, according to one or more embodiments. The features in the communication diagram 500 may be used in conjunction with other embodiments, for example, as part of performing the method 300 of FIG. 3.

During a registration phase the electronic device 135 transmits, in a first communication 505, account information of the customer 130 and an identifier 245 of the electronic device 135 to the payment network 210. In some embodiments, the identifier 245 comprises a MAC address of the Wi-Fi network interface card or of a NFC chip of the electronic device 135. In some embodiments, the first communication 505 is transmitted directly between the electronic device 135 and an issuer of the payment method (e.g., the card issuer 230 of the payment network 210). The payment network 210 returns to the electronic device 135, in a second communication 510, a token which corresponds to the combination of the customer and the electronic device 135. In some embodiments, the issuer of the payment method transmits the token to the electronic device 135 with a time-to-live (TTL) value, such that the token expires after a predetermined amount of time. The TTL value limits the possibility of fraudulent use by another who improperly obtains the token. In some embodiments, the information of the first communication 405 is transmitted between the card issuer 230 and one or more other elements of the payment network 210, such as the payment processor 220.

During a payment authorization phase, the POS system 150 provides transaction information to the customer in a third communication 515. In some embodiments, providing the transaction information comprises printing a first receipt with the transaction information, prompting the customer to present payment information to the POS system 150 in a fourth communication 520 (e.g., a payment method for an initial authorization).

The POS system 150 transmits, in a fifth communication 525, a request for an initial authorization to the payment network 210. The POS system 150 receives, in a sixth communication 530, the initial authorization from the payment network 210.

The electronic device 135 transmits, in a seventh communication 535, the account information, the identifier of the electronic device, and an amount of the transaction to the payment network 210. In some embodiments, the electronic device 135 communicates with an element of the payment network 210 (e.g., the card issuer 230) using a communication path that is distinct from the communication path used by the electronic device 135 for payment authorization (e.g., the electronic device 135 communicatively coupled with the payment gateway 215).

In some embodiments, the amount of the transaction is provided via user input to an input device of the electronic device (e.g., a virtual numeric pad displayed on a touchscreen). In other embodiments, the amount of the transaction is acquired from an image captured by a camera of the electronic device, and the electronic device performs OCR on the image to determine the amount of the transaction. The payment network 210 returns, in an eighth communication 540, a single-use token to the electronic device 135 for the transaction. In some embodiments, the single-use token is linked to the amount of the transaction, or alternately, to a maximum authorized amount for the transaction.

Responsive to the initial authorization, the POS system 150 provides the transaction information to the customer in a ninth communication 545. In some embodiments, providing the transaction information comprises printing a second receipt that includes a field for a customer-added amount, such as a gratuity.

The POS system 150 receives, in a tenth communication 550, updated transaction information, which in some cases includes a gratuity. The POS system 150 receives, in an eleventh communication 555, the single-use token and the identifier of the electronic device from the electronic device 135. In some embodiments, receiving the eleventh communication 555 indicates that the customer has been locally authenticated by the electronic device, using a password or biometrics.

The POS system 150 transmits, in a twelfth communication 560, the updated transaction information, the single-use token, and the identifier of the electronic device to the payment network 210 for a subsequent authorization. The POS system 150 receives, in a thirteenth communication 565, the payment authorization for the transaction from the payment network 210. In some embodiments, receiving the thirteenth communication 565 indicates that the single-use token and identifier of the electronic device were previously registered. In some embodiments, receiving the thirteenth communication 565 indicates that the amount of the updated transaction information is less than or equal to an authorized amount for the transaction.

In some embodiments, the payment processor 220 of the payment network 210 validates the updated transaction information, single-use token, and identifier using information included in the first communication 405 in the registration phase. Using the token-based validation, the transaction can be authorized without using the PAN (primary account number) of the customer. In this way, the transaction authorization can be completed without requiring the POS system 150 to be maintained within the scope of PCI DSS.

Figure 6:
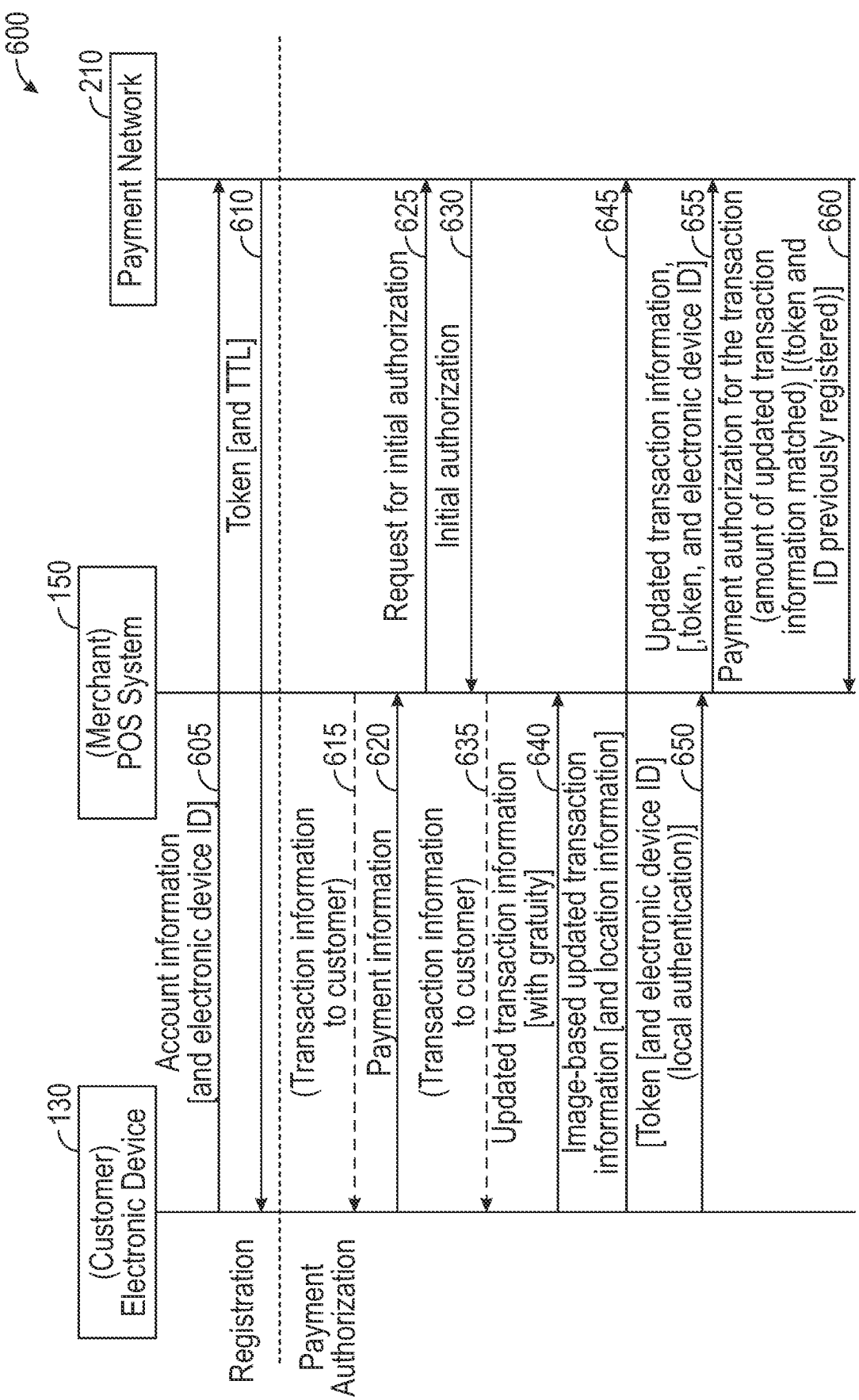
FIG. 6 is a communication diagram illustrating exemplary payment authorization using a captured image, according to one or more embodiments.

FIG. 6 is an exemplary communication diagram 600 illustrating payment authorization using a captured image, according to one or more embodiments. The features in the communication diagram 600 may be used in conjunction with other embodiments, for example, as part of performing the method 300 of FIG. 3.

During a registration phase the electronic device 135 transmits, in a first communication 605, account information of the customer 130 and an identifier 245 of the electronic device 135 to the payment network 210. In some embodiments, the identifier 245 comprises a MAC address of the Wi-Fi network interface card or of a NFC chip of the electronic device 135. In some embodiments, the first communication 605 is transmitted directly between the electronic device 135 and an issuer of the payment method (e.g., the card issuer 230 of the payment network 210). The payment network 210 returns to the electronic device 135, in a second communication 610, a token corresponds to the combination of the customer and the electronic device 135. In some embodiments, the issuer of the payment method transmits the token to the electronic device 135 with a time-to-live (TTL) value, such that the token expires after a predetermined amount of time. The TTL value limits the possibility of fraudulent use by another who improperly obtains the token. In some embodiments, the information of the first communication 605 is transmitted between the card issuer 230 and one or more other elements of the payment network 210, such as the payment processor 220.

During a payment authorization phase, the POS system 150 provides transaction information to the customer in a third communication 615. In some embodiments, providing the transaction information comprises printing a first receipt with the transaction information, prompting the customer to present payment information to the POS system 150 in a fourth communication 620 (e.g., a payment method for an initial authorization).

The POS system 150 transmits, in a fifth communication 625, a request for an initial authorization to the payment network 210. The POS system 150 receives, in a sixth communication 630, the initial authorization from the payment network 210.

Responsive to the initial authorization, the POS system 150 provides the transaction information to the customer in a seventh communication 635. In some embodiments, providing the transaction information comprises printing a second receipt that includes a field for a customer-added amount, such as a gratuity.

The POS system 150 receives, in an eighth communication 640, updated transaction information, which in some cases includes a gratuity.

In some embodiments, the electronic device 135 transmits, in a ninth communication 645, image-based updated transaction information (and optionally location information) to the payment network 210. In some embodiments, the electronic device 135 captures an image of a physical receipt that includes the customer-provided updated transaction information. In some embodiments, OCR processing is performed on the image and the customer-provided updated transaction information is transmitted to the payment network 210. In other embodiments, the image is transmitted by the electronic device 135 to the payment network 210, and OCR processing occurs within the payment network 210.

The POS system 150 receives, in a tenth communication 650, the token and the identifier of the electronic device 135 from the electronic device 135. In some embodiments, receiving the ninth communication 645 indicates that the customer has been locally authenticated by the electronic device 135, using a password or biometrics. In some embodiments, the POS system 150 extracts the identifier of the electronic device 135 from the protocol used for the communication.

The POS system 150 transmits, in an eleventh communication 655, the updated transaction information, token, and identifier of the electronic device to the payment network 210 for a subsequent authorization. The POS system 150 receives, in a twelfth communication 660, the payment authorization for the transaction from the payment network 210. In some embodiments, receiving the twelfth communication 660 indicates that the amount of the customer-provided updated transaction information in the ninth communication 645 matches the amount of the updated transaction information received in the eleventh communication 655. In some embodiments, receiving the twelfth communication 660 further indicates that the token and identifier of the electronic device were previously registered with the issuer of the payment method.

In alternate embodiments, the payment authorization sequence shown the in the communication diagram 600 may be performed without the electronic device 135 obtaining and/or transmitting the token. In one non-limiting example, the customer receives a first receipt from the merchant with an initial amount of the transaction. The customer presents a payment method (e.g., a credit card) to the merchant, and the payment information is provided to the POS system. Upon receiving an initial authorization for the initial amount using the payment method, the customer receives a second receipt from the merchant that includes a field for a customer-added amount (e.g., a gratuity).

The customer captures an image of the second receipt using a camera of the electronic device. In some embodiments, the second receipt includes the customer-added amount (e.g., written in by the customer) in the field. In other embodiments, the second receipt does not include the customer-added amount. The image-based updated transaction information (whether as an image or as OCR-provided text) is transmitted to the issuer of the payment method (e.g., the card issuer 230). In some cases, the image-based updated transaction information is transmitted through an app provided by, or a website of, the issuer of the payment method.

Where the image-based updated transaction information does not include the customer-added amount, the app or website of the issuer prompts the customer whether to add a gratuity. The customer may add the gratuity using an input device of the electronic device, and approves payment of the transaction using the payment method.

The issuer of the payment method compares the amount(s) of the image-based updated transaction information with the initial amount of the transaction (e.g., used for the initial authorization). If the different amounts match (or the difference does not indicate an excessive gratuity), the issuer of the payment method authorizes the payment and transmits the verification via the payment network 210 to the POS system 150. In some embodiments, the issuer of the payment method may further compare location information of the customer (e.g., included in metadata of the captured image, or the network connection information of the electronic device) with the location of the merchant when determining whether to authorize the payment. In this way, the responsibility for authorizing gratuity amounts (and associated risk) may be transferred from the merchant to the issuer of the payment method.

In some embodiments, the payment processor 220 of the payment network 210 validates the updated transaction information, token, and identifier using information included in the first communication 605 in the registration phase. Using the token-based validation, the transaction can be authorized without using the PAN (primary account number) of the customer. In this way, the transaction authorization can be completed without requiring the POS system 150 to be maintained within the scope of PCI DSS.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
 receiving, by one or more computer processors of a POS system, payment information;
 receiving, by the one or more computer processors, a communication from an electronic device of a user, wherein the communication comprises a token that corresponds to the combination of the user and the electronic device;
 extracting, by the one or more computer processors, an identifier of the electronic device from header information of the communication;
 receiving, by user input at an input device of the POS system, updated transaction information including a gratuity;
 transmitting, by the one or more computer processors to a payment processor of a payment network, the token and the identifier of the electronic device; and
 receiving, by the one or more computer processors from the payment network, a payment authorization for a transaction that indicates that the token and the identifier of the electronic device were previously registered with an issuer corresponding to the payment information,
 wherein receiving the payment authorization for the transaction further indicates that an amount of the updated transaction information is less than or equal to an authorized amount for the transaction, and
 wherein receiving the payment authorization further indicates that the payment processor of the issuer:
  has received, from the electronic device, customer-provided updated transaction information based on optical character recognition (OCR) processing of a captured image of a physical receipt; and
  has determined that an amount of the customer-provided updated transaction information matches the amount of the updated transaction information.

2. The method of claim 1, wherein the payment information comprises a payment method presented by the user during the transaction, and wherein the issuer is an issuer of the payment method.

3. The method of claim 1, wherein the identifier of the electronic device is a MAC address of the electronic device.

4. The method of claim 1, wherein the token is a single-use token that is issued by the issuer to the electronic device, and wherein the single-use token is requested by the electronic device using at least an initial amount of the transaction,
 and wherein receiving the payment authorization for the transaction further indicates that the amount of the updated transaction information is less than or equal to an authorized amount for the transaction that is included in the single-use token.

5. A computer program product comprising:
 a non-transitory computer-readable storage medium having computer-readable program code embodied therewith, the computer-readable program code executable by one or more computer processors of a POS system to:
  receive payment information;
  receive a communication from an electronic device of a user, wherein the communication comprises a token that corresponds to the combination of the user and the electronic device;
  extract an identifier of the electronic device from header information of the communication;
  receive, by user input at an input device, updated transaction information including a gratuity;
  transmit, to a payment processor of a payment network, the token and the identifier of the electronic device; and
  receive, from the payment network, a payment authorization for a transaction that indicates that the token and the identifier of the electronic device were previously registered with an issuer corresponding to the payment information,
 wherein receiving the payment authorization for the transaction further indicates that an amount of the updated transaction information is less than or equal to an authorized amount for the transaction, and
 wherein receiving the payment authorization further indicates that the payment processor of the issuer:
  has received, from the electronic device, customer-provided updated transaction information based on optical character recognition (OCR) processing of a captured image of a physical receipt; and
  has determined that an amount of the customer-provided updated transaction information matches the amount of the updated transaction information.

6. The computer program product of claim 5, wherein the payment information comprises a payment method presented by the user during the transaction, and wherein the issuer is an issuer of the payment method.

7. The computer program product of claim 5, wherein the identifier of the electronic device is a MAC address of the electronic device.

8. The computer program product of claim 5, wherein the token is a single-use token that is issued by the issuer to the electronic device, and wherein the single-use token is requested by the electronic device using at least an initial amount of the transaction, and
 wherein receiving the payment authorization for the transaction further indicates that the amount of the updated transaction information is less than or equal to an authorized amount for the transaction that is included in the single-use token.

9. A system comprising:
 one or more computer processors of a POS system; and
 a memory storing program code executable by the one or more computer processors to perform a payment authorization service comprising:
  receiving payment information;
  receiving a communication from an electronic device of a user, wherein the communication comprises a token that corresponds to the combination of the user and the electronic device;
  extracting an identifier of the electronic device from header information of the communication;

receiving, by user input at an input device, updated transaction information including a gratuity;

transmitting, to a payment processor of a payment network, the token and the identifier of the electronic device; and receiving, from the payment network, a payment authorization for a transaction that indicates that the token and the identifier of the electronic device were previously registered with an issuer corresponding to the payment information, wherein receiving the payment authorization for the transaction further indicates that an amount of the updated transaction information is less than or equal to an authorized amount for the transaction, and wherein receiving the payment authorization further indicates that the payment processor of the issuer:

has received, from the electronic device, customer-provided updated transaction information based on optical character recognition (OCR) processing of a captured image of a physical receipt; and has determined that an amount of the customer-provided updated transaction information matches the amount of the updated transaction information.

10. The system of claim 9, wherein the payment information comprises a payment method presented by the user during the transaction, and wherein the issuer is an issuer of the payment method.

11. The POS system of claim 9, wherein the token is a single-use token that is issued by the issuer to the electronic device, and wherein the single-use token is requested by the electronic device using at least an initial amount of the transaction.

\* \* \* \* \*